(12) United States Patent  (10) Patent No.: US 8,909,835 B2
Kataoka et al.  (45) Date of Patent: Dec. 9, 2014

(54) COMPUTER SYSTEM AND METHOD OF CONTROLLING COMPUTER SYSTEM

(75) Inventors: Masaki Kataoka, Kanagawa (JP); Hideaki Komatsu, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 12/779,456

(22) Filed: May 13, 2010

(65) Prior Publication Data

US 2010/0293314 A1  Nov. 18, 2010

(30) Foreign Application Priority Data

May 14, 2009  (JP) ................................. 2009-117642

(51) Int. Cl.
  *G06F 13/14*  (2006.01)
  *G06F 13/24*  (2006.01)

(52) U.S. Cl.
  CPC ..................................... *G06F 13/24* (2013.01)
  USPC ........................................... 710/266; 710/305

(58) Field of Classification Search
  USPC .................................. 710/305, 266; 395/735
  See application file for complete search history.

(56) References Cited

U.S. PATENT DOCUMENTS

| 4,250,546 | A | * | 2/1981 | Boney et al. .................. 710/262 |
| 5,410,708 | A | * | 4/1995 | Miyamori ..................... 710/264 |
| 5,469,571 | A | * | 11/1995 | Bunnell ........................ 718/103 |
| 5,568,485 | A | * | 10/1996 | Chaisemartin ................ 370/462 |
| 5,619,706 | A | * | 4/1997 | Young ........................... 710/268 |
| 5,778,220 | A | * | 7/1998 | Abramson et al. ............ 712/244 |
| 5,875,342 | A | * | 2/1999 | Temple ......................... 710/260 |
| 5,896,549 | A | * | 4/1999 | Hansen et al. .................. 710/22 |
| 5,911,065 | A | * | 6/1999 | Williams et al. .............. 718/107 |
| 5,937,199 | A | * | 8/1999 | Temple ......................... 710/262 |
| 6,032,245 | A | * | 2/2000 | Georgiou et al. ............... 712/23 |
| 6,170,033 | B1 | * | 1/2001 | Bennett ......................... 710/260 |
| 6,356,998 | B2 | * | 3/2002 | Roche ........................... 712/244 |
| 6,651,126 | B1 | * | 11/2003 | Cantrell et al. ............... 710/264 |
| 6,674,841 | B1 | * | 1/2004 | Johns et al. .................. 379/67.1 |

(Continued)

FOREIGN PATENT DOCUMENTS

| JP | 64-053237 A | 3/1989 |
| JP | 02-187829 A | 7/1990 |

(Continued)

OTHER PUBLICATIONS

David C. Black et al., "SystemC: From the Ground Up," book, 2006, Springer Science & Business Media, Inc.

*Primary Examiner* — Paul R Myers
*Assistant Examiner* — Christopher A Daley
(74) *Attorney, Agent, or Firm* — Tutunjian & Bitetto, P.C.; Jennifer R. Davis (57) ABSTRACT

CPU architecture is modified so that content of the interrupt mask register can be changed directly based on a decoding result of an instruction decoder of a CPU. Such modification does not require a great deal of labor in changing a CPU design. In addition, an extended CALL instruction and an extended software interrupt instruction are added to the CPU, and each of the extended CALL instruction and the extended software interrupt instruction additionally has a function of changing the value of the interrupt mask register. Atomicity is achieved by: allowing such a single instruction to concurrently execute a call of a process and a value change of the interrupt mask register; and disabling other interrupts during execution of the single instruction.

14 Claims, 4 Drawing Sheets

(56) References Cited

U.S. PATENT DOCUMENTS

| | | | |
|---|---|---|---|
| 6,732,298 B1* | 5/2004 | Murthy et al. | 714/34 |
| 6,845,419 B1* | 1/2005 | Moyer | 710/264 |
| 6,883,053 B2* | 4/2005 | Shinagawa et al. | 710/263 |
| 7,130,951 B1* | 10/2006 | Christie et al. | 710/261 |
| 7,197,587 B2* | 3/2007 | Chheda et al. | 710/262 |
| 7,451,296 B2* | 11/2008 | Marr et al. | 712/220 |
| 7,496,958 B2* | 2/2009 | Kelley et al. | 726/17 |
| 7,546,446 B2* | 6/2009 | Henry et al. | 712/244 |
| 7,716,407 B2* | 5/2010 | Almasi et al. | 710/260 |
| 7,882,293 B2* | 2/2011 | Burdass et al. | 710/262 |
| 7,954,012 B2* | 5/2011 | Gooding | 714/45 |
| 7,984,281 B2* | 7/2011 | Plondke et al. | 712/244 |
| 8,019,914 B1* | 9/2011 | Vasquez et al. | 710/36 |
| 2003/0167366 A1* | 9/2003 | Radhakrishna | 710/262 |
| 2004/0153596 A1* | 8/2004 | Monteiro | 710/305 |
| 2004/0158640 A1* | 8/2004 | Philbrick et al. | 709/230 |
| 2005/0102458 A1* | 5/2005 | Ober et al. | 710/260 |
| 2008/0091867 A1* | 4/2008 | Plondke et al. | 710/261 |
| 2009/0177828 A1* | 7/2009 | Almasi et al. | 710/266 |

FOREIGN PATENT DOCUMENTS

| | | |
|---|---|---|
| JP | 03-240831 A | 10/1991 |
| JP | 04-077930 A | 3/1992 |
| JP | 10-074148 | 3/1998 |
| JP | 2004-199558 | 7/2004 |
| JP | 2007-128396 | 1/2008 |

* cited by examiner

FIG. 1

|  | BEFORE INSTRUCTION EXECUTION | AFTER INSTRUCTION EXECUTION |
|---|---|---|
| PROGRAM COUNTER | ADDRESS OF INSTRUCTION | START ADDRESS OF SHIFTING DESTINATION |
| INTERRUPT MASK | M | N |
| STACK STATE | ... | INFORMATION ON SYSTEM REGISTER <br> ADDRESS OF INSTRUCTION NEXT TO CALL_CL <br> ... |

FIG. 2

|  | BEFORE INSTRUCTION EXECUTION | AFTER INSTRUCTION EXECUTION |
|---|---|---|
| PROGRAM COUNTER | ADDRESS OF INSTRUCTION | START ADDRESS OF SHIFTING DESTINATION |
| INTERRUPT MASK | M | PRIORITY LEVEL OF SHIFTING DESTINATION |
| STACK STATE | ... | INFORMATION ON SYSTEM REGISTER <br> ADDRESS OF INSTRUCTION NEXT TO INT_CH <br> ... |

COMPUTER SYSTEM AND METHOD OF CONTROLLING COMPUTER SYSTEM

CROSS REFERENCE TO RELATED APPLICATION

This application claims priority under 35 U.S.C. §119 from Japanese Patent Application No. 2009117642 filed May 14, 2009, the entire contents of which are incorporated by reference herein.

BACKGROUND OF THE INVENTION

1. Field of the Invention

The present invention relates to a computer system. More particularly, the present invention relates to an instruction controller and interrupt control method that are used in an embedded system.

2. Description of the Related Art

In recent years, embedded systems have been used in every field in society, and have been taking important roles. Specifically, the embedded systems are used in a wide variety of fields such as digital cameras, mobile phones, DVD players, robots, flight control systems, fuel injection systems and automatic brake systems of automobiles.

A conventional general definition of an embedded system is a computer system including hardware and software combined in a tightly coordinated manner so as to execute a dedicated function.

Additionally, one of the features that an embedded system is required to have is a real-time performance capability. Specifically, the embedded system normally receives a notification as an interrupt from an input-output device in order to quickly respond to changes in conditions of the input/output device coupled to the embedded system. An interrupt signal is inputted to an interrupt controller, and then is enabled or suspended in accordance with a value set in an interrupt mask register upon the receipt of the interrupt signal. An enabled interrupt is looked up in an interrupt table, whereby control is shifted to an interrupt handler in a vector address corresponding to the enabled interrupt.

Here, interrupt processes are respectively assigned priority orders based on their urgency. If a higher priority interrupt process occurs during execution of a lower priority interrupt process, the control is passed to the higher priority interrupt process, and the lower priority interrupt process is suspended and waits until the higher priority interrupt process is completed. Then, after completion of the higher priority interrupt process, execution of the lower priority interrupt process restarts.

On the other hand, if a lower priority interrupt process occurs during execution of a higher priority interrupt process, the lower priority interrupt process cannot immediately start to execute, and goes into a suspended state to wait until the a higher priority interrupt process is completed. In general, interrupt processes based on such priority orders are executed in accordance with a value set in the above interrupt mask register.

Meanwhile, an ECU for an engine of an automobile, for example, has the following problem. Specifically, as an engine rotor rotates, interrupt processes for calculating a top dead center sequentially come into an ECU of an automobile engine. Then, interrupt processes for causing fuel injection and ignition come in after the completion of the processes for the top dead center calculation. The processes for the top dead center calculation need to be completed before the interrupt processes for causing fuel injection and ignition. Otherwise, the processes are required to be temporarily cancelled for the purpose of securing reliability. This is called run time constraints.

In order to be cancelled properly, the interrupt processes need to be appropriately assigned priority orders under the run time constraints. Inappropriate priority orders may cause another interrupt process to come in during execution of processes under the run time constraints, and thus make it more difficult to meet the run time constraints.

In the above example, the interrupt processes for the top dead center calculation can be executed with a higher priority order, whereas the interrupt process for the fuel injection and ignition can be executed with a lower priority order. Such settings prevent the interrupt processes for the fuel injection and ignition from starting until the interrupt processes for the top dead center calculation are completed. Thereby, the order of the processes is fixed. However, a lower priority interrupt process cannot be executed unless a value in the interrupt mask register is changed to a lower value.

According to a conventional method for achieving such execution, the execution of an interrupt process to be processed next with a lower priority order is enabled by executing an instruction to change the content of an interrupt mask register while calling the lower priority interrupt process through a usual call instruction. However, the method has a problem of sometimes allowing another interrupt process to come in between the call instruction and the instruction to change the content of the interrupt mask register, because of the incapability of masking such interrupt instruction.

According to another conventional method, when a process to be processed next with a lower priority order is called, a software interrupt is caused to execute an instruction to change content of an interrupt mask register. In this case, all other interrupt processes also come in together in the beginning of the next interrupt process. Consequently, the next interrupt process cannot be prevented from being influenced by another interrupt process.

To cope with this, another conventional method utilizes an interrupt from a peripheral device. Specifically, an instruction for changing content of an interrupt mask register is executed upon reception of an interrupt from a peripheral device. Such execution of the interrupt from the peripheral device can greatly prevent other interrupt processes from coming in during the execution, thus improving process reliability. However, the method has a problem that the execution takes a long time due to utilization of a peripheral device.

Japanese Patent Application Publication No. Hei. 10-074148 discloses a technique in which a priority judgment circuit selects an interrupt process from one or more interrupt requests that have occurred; a comparator compares a level signal indicating a priority level assigned to the selected interrupt process with a priority level outputted from an instruction abort resister to allow the abort of an instruction; and an abort signal and the request for the interrupt process are outputted to a central processing unit if the priority level assigned to the requested interrupt process is higher than the priority level to allow the abort of the instruction.

Japanese Patent Application Publication No. 2004-199558 discloses a technique of executing a low priority interrupt handler when a high priority interrupt handler goes into an event-waiting state during its execution in the following manner. Specifically, at that moment, a priority order controller changes the priority of the high priority interrupt handler to the lowest priority. In addition, an execution arbitrator saves the content of a register necessary to surely continue the processing of the high priority interrupt handler, in a register reserved area fixedly reserved in a stack area for the high priority interrupt handler. At the same time, the execution arbitrator loads the content in a register reserved area for the low priority interrupt handler, and thus causes the low priority interrupt handler to be executed.

Japanese Patent Application Publication No. 2007-128396 discloses a technique of: disabling occurrence of an interrupt event during execution of an interrupt handler called upon reception of the interrupt event; activating a start process task assigned a lower execution priority level than a normal application; activating a data processing task when an execution right is passed to the start process task; executing data processing related to an interrupt factor causing the interrupt event when the execution right is passed to the data processing task; and then enabling the interrupt event again.

Even these prior art documents, however, neither suggest nor disclose any technique which prevents influence from another interrupt while a value of an interrupt vector is changed. Without such a technique, numerous interrupt patterns may occur when control is passed from a higher priority interrupt process to a lower priority interrupt process. Designing a program whose proper operation is guaranteed for all of the interrupt patterns is difficult in the program design phase based on the conventional techniques such as those described in these prior art documents.

Furthermore, it is more difficult to create, in the program test phase, test cases necessary for causing all of the possible interrupt patterns that can occur when control is passed from a higher priority interrupt process to a lower priority interrupt process.

SUMMARY OF THE INVENTION

Accordingly, the present invention achieves atomicity in an embedded system when a value of an interrupt vector is changed for an interrupt, more specifically, to prevent the interrupt from being influenced by other instructions for a call, an interrupt, or an exception, for example. The atomicity is achieved by changing a configuration of a CPU so as to impart extended functions to a CALL instruction and a software interrupt instruction in the CPU.

According to an aspect of the present invention, a computer system is provided. The computer system, which includes an interrupt mask register, and in which levels are set for respective interrupt processes, the computer system including: designation means for designating a level to be set in the interrupt mask register, and an address of a process to be called; execution means for passing control to the address while assigning the interrupt mask register the designated level based on information designated by the designation means; and means for disabling an interrupt while the execution means operates.

According to another aspect of the present invention, a further computer system is provided. The computer system includes: an interrupt mask register; level storage means storing a level for each interrupt; execution means, in response to occurrence of an interrupt, for shifting execution process to the interrupt while acquiring a level for the interrupt, to which the execution process is shifted, from the level storage means, and setting the acquired level in the interrupt mask register; and means for disabling another interrupt while the execution means operates.

According to another aspect of the present invention, a method is provided. The method of controlling a computer system, which includes an interrupt mask register, and in which levels are set for respective interrupt processes, the method includes the steps of: designating a level to be set in the interrupt mask register and an address of a process to be called; passing control to the address while assigning the interrupt mask register the designated level on the basis of information designated in the designation step; and disabling an interrupt during the execution step.

According to another aspect of the present invention, a further method is provided. The method of controlling a computer system, which includes an interrupt mask register, and in which levels are set for respective interrupt processes, the method includes the steps of: in response to occurrence of an interrupt, shifting execution process to the interrupt while acquiring a level for the interrupt, to which the execution process is shifted, from a level storage means, and setting the acquired level in the interrupt mask register; and disabling another interrupt during the execution step.

According to the present invention, CPU architecture is modified so that a content of an interrupt mask register can be changed directly based on a decoding result of an instruction decoder of the CPU. Because such modification is normally not extensive, design changes in the CPU do not require a great deal of labor. In addition, an extended CPU instruction and an extended software interrupt instruction are added to the CPU. Each of the extended CPU instruction and the extended software interrupt instruction has a function of changing a value of the interrupt mask register. With respect to a value of the interrupt mask register, the present invention employs a technique of assigning the value based on an operand, or a technique of setting a propriety level of an interrupt process routine to which execution is shifted.

Atomicity is achieved by: allowing such a single instruction to concurrently execute a call of a process and a value change of the interrupt mask register; and disabling other interrupts during execution of the single instruction.

DETAILED DESCRIPTION OF THE PREFERRED EMBODIMENT

A configuration and processes of an embodiment of the present invention will be described below with reference to the drawings. In the following description, unless otherwise stated, same elements will be denoted by same reference numerals throughout the drawings. It should be understood that the configuration and processes described here are merely shown as one embodiment, and are not intended to limit the technical scope of the present invention to this embodiment.

Figure 1:
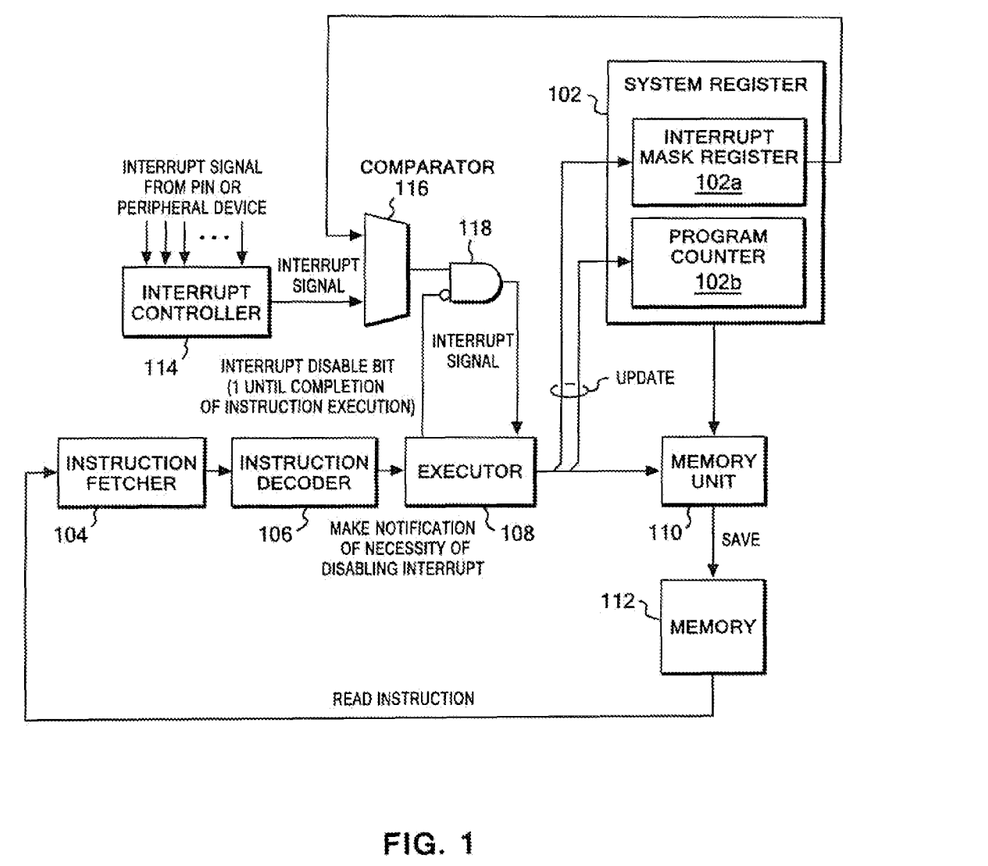
FIG. 1 is a block diagram of a hardware configuration used for implementing the present invention.

FIG. 1 is a block diagram of a hardware configuration used for implementing the present invention. The configuration in FIG. 1 shows architecture of a typical CPU, and includes: a system register 102; an instruction fetcher 104 that fetches an instruction from a memory; an instruction decoder 106 that interprets the fetched instruction; and an executor 108 that executes the instruction interpreted by the instruction decoder 106.

The system register 102 consists of dedicated registers, such as an interrupt mask register 102a, and a program counter 102b, for example, each of which is usable exclusively for a particular purpose. Among these, FIG. 1 shows only the interrupt mask register 102a and the program counter 102b as representative ones of the dedicated registers.

The configuration in FIG. 1 further includes: a memory unit 110; and a memory 112. The memory unit 110 writes an execution result of the executor 108 into an assigned address in the memory 112. The memory 112 is preferably a random access memory (RAM), and has programs and data stored therein. Into the memory 112, a system program is loaded from a ROM (not shown) by a predetermined loader (not shown) at the start-up of a system.

The instruction fetcher 104 fetches an instruction from the memory 112 with an address assigned by the program counter 102b.

An interrupt controller 114 has a terminal that accepts an interrupt signal from a pin or a peripheral device, and transmits the interrupt signal to a comparator 116 in accordance with the priority level (also referred to as the priority order) of the interrupt signal. In the interrupt controller 114, priority levels of respective interrupt numbers can be set.

The comparator 116 compares the priority level of the interrupt signal received from the interrupt controller 114 with a content of the interrupt mask register 102a. Then, the comparator 116 outputs a logic high level signal if the priority level of the interrupt signal received from the interrupt controller 114 is greater than the value stored in the interrupt mask register 102a. On the other hand, the comparator 116 outputs a logic low level signal if the priority level of the interrupt signal received from the interrupt controller 114 is equal to or less than the value stored in the interrupt mask register 102a.

An output from the comparator 116 is provided as one of two inputs given to an AND gate 118. The other input to the AND gate 118 is provided by the executor 108. With respect to a certain instruction, the executor 108 maintains the other input to the AND gate 118 at a logic high level from the start to the end of execution of the instruction. Because the other input to the AND gate 118 is inputted to the AND gate 118 after being inverted, an output signal from the AND gate 118 is maintained at a logic low level from the start to the end of execution of the instruction executed by the executor 108. In this embodiment, a signal inputted from the executor 108 to the AND gate 118 will be referred to as an interrupt disable bit.

The output signal from the AND gate 118 is provided to the executor 108. The executor 108 operates so as not to execute an interrupt instruction if the output signal from the AND gate 118 is at a logic high level. An interrupt instruction thus determined not to be executed is put into a suspended state, and is later executed when executable, or simply abandoned.

Next, instructions extended according to the present invention will be described. In the present invention, instructions to shift control are extended, which includes a CALL instruction for calling a subroutine, and an INT instruction for an interrupt.

First, the CALL instruction is assumed to be an instruction that calls an existing subroutine, and the format of the instruction with operand will be:

CALL <register number having start address of shifting destination>.

When an instruction obtained by extending the CALL instruction according to the present invention is denoted as a CALL_CL instruction, the format of the extended instruction with operand will be:

CALL_CL<register number having start address of shifting destination>, <value set in interrupt mask>.

If an instruction length of the CPU is assumed to be 32 bits, the CALL_CL instruction is encoded, for example, as follows within 32 bits so that one instruction would not overlap another instruction. Specifically, the CALL_CL instruction is interpreted by the instruction decoder 106 as having an instruction expression where: the CALL_CL instruction itself corresponds to 20 bits; the register number having the start address of the shifting destination corresponds to 4 bits; the value set in the interrupt mask corresponds to 4 bits; and the rest of 4 bits are set to 0.

With FIG. 1, how the CALL_CL instruction is interpreted and executed will be described. First, the instruction fetcher 104 reads the CALL_CL instruction with its operand, and the instruction decoder 106 decodes the instruction thus read. Through the decoding, the instruction decoder 106 acquires a start address of a shifting destination, and a value that should be set in the interrupt mask.

Based on a result of this decoding, the executor 108 executes the instruction, sets the interrupt disable bit to 1, saves all values held in the system register into a stack, sets in the interrupt mask register 102a a value given as a value for the interruption mask, and sets a value of the program counter 102b to the start address of the shifting destination. Thereafter, the executor 108 resets the interrupt disable bit to 0.

Figure 2:
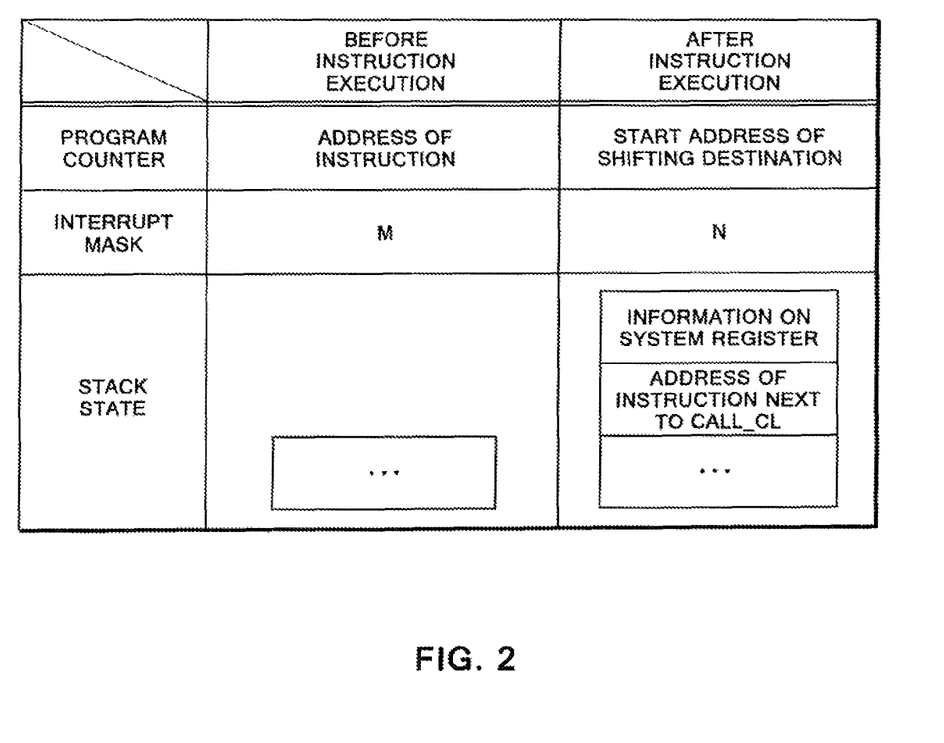
FIG. 2 is a table showing a state change by invoking of a CALL_CL instruction.

FIG. 2 is a diagram showing a change between states before and after execution of the CALL_CL instruction. As can be seen from FIG. 2, the execution of the CALL_CL instruction brings about not only conditions where the program counter has been set to the start address of the shifting destination, and where a state of the system register and an address of an instruction next to the CALL_CL instruction has been loaded into the stack because these correspond to a process after return, but also a condition where the value of the interrupt mask has been overwritten from M to N.

Next, the INT instruction is assumed to be an existing interrupt instruction, and the format of the instruction with operand is assumed to be:

INT <interrupt number>.

When an instruction obtained by extending the INT instruction according to the present invention is denoted as an INT_CH instruction, the format of the instruction with operand will be:

INT_CH<interrupt number>.

Although the INT_CH instruction appears equal to the INT instruction from above, the INT_CH instruction is different in that the range of assignable interrupt numbers includes not only numbers held in user-defined areas but all interrupt numbers held by the system. Effects brought about by this difference will be made more understandable through the following description.

With FIG. 1, how the INT_CH instruction is interpreted and executed will be described. First, the instruction fetcher 104 reads the INT_CH instruction with its operand, and the instruction decoder 106 decodes the instruction thus read. The instruction decoder 106 acquires the interrupt number through the decoding.

Based on a result of this decoding, the executor 108 executes the instruction, sets the interrupt disable bit to 1, saves all values held in the system register into a stack, and acquires, from the interrupt controller 114, the priority level of an interrupt handler of the shifting destination on the basis of information on the interrupt number. Then, while setting in the interrupt mask register 102a the value of the priority level of the interrupt handler of the shifting destination, the executor 108 sets a value of the program counter to the start address of the shifting destination. Thereafter, the executor 108 resets the interrupt disable bit to 0.

Figure 3:
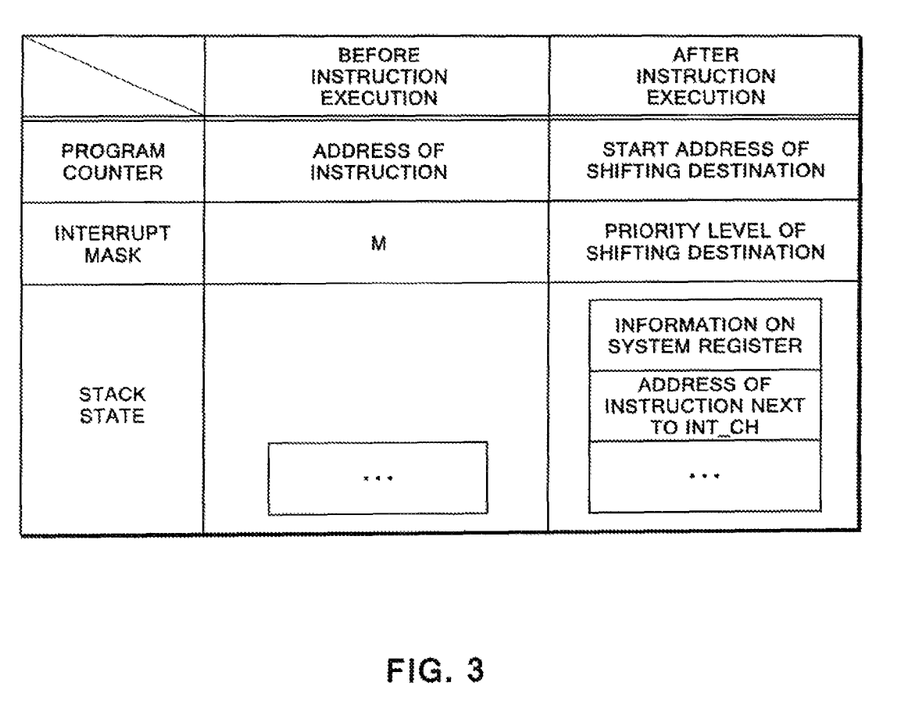
FIG. 3 is a table showing a state change by invoking of an INT_CH instruction.

FIG. 3 is a diagram showing a change between states before and after execution of the INT_CH instruction. As can be seen from FIG. 3, execution of the INT_CH instruction brings about not only conditions where the program counter is set to the start address of the shifting destination, and where a state of the system register and an address of an instruction next to the INT_CH instruction are loaded into the stack because these correspond to a process after return, but also a condition where the value of the interrupt mask is overwritten from M to the priority level of the shifting destination.

Figure 4:
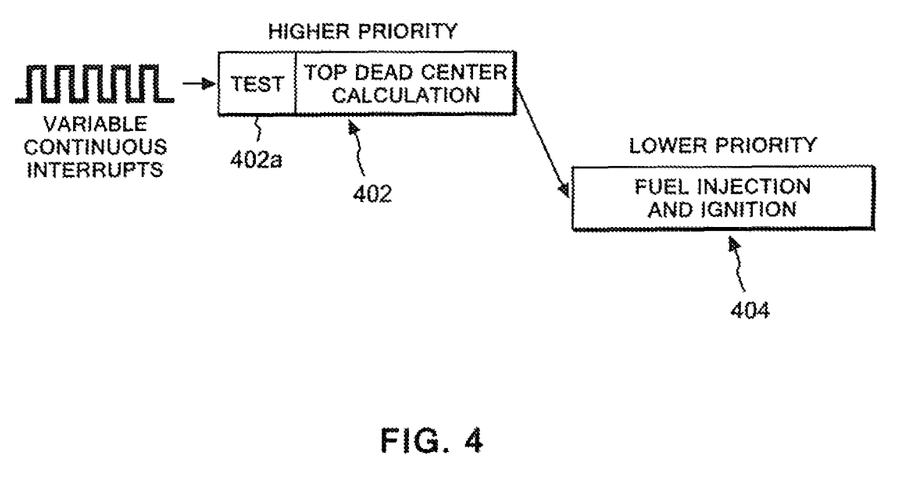
FIG. 4 is a diagram that illustrates processes for transitioning from a higher-priority interrupt process to a lower-priority interrupt process.

FIG. 4 is a diagram that illustrates processes for transitioning from an interrupt process 402 for top dead center calculation to an interrupt process 404 for fuel injection and ignition, the interrupt process 402 assigned a higher priority, the interrupt process 404 assigned a lower priority. In FIG. 4, the higher-priority interrupt process 402 for top dead center calculation is executed as a variable and continuous interrupt. According to the present invention, the INT_CH instruction allows transition to the lower-priority interrupt process 404 for fuel injection and ignition during the higher-priority level interrupt process 402 for top dead center calculation. Thereby, the priority level of the interrupt process 404 for fuel injection and ignition is set in the interrupt mask register 102a, whereby the lower-priority interrupt process 404 for fuel injection and ignition is reliably executed after the completion of the higher-priority interrupt process 402 for top dead center calculation.

Thereby, when, whether or not information on any lower-priority interrupt process exists in the stack is checked at a starting time 402a of the interrupt process 402 for top dead center calculation and when information on any low-priority interrupt process exists in the stack, it can be determined that an error has occurred and the process can be cancelled based on the determination.

Next, a part of an example of CPU hardware implemented by the SystemC according to the present invention will be described. Note particularly parts labeled as CALL_CL and INT_CH. From the following code, it will be understood that a configuration according to the present invention can be realized without extensively modifying the design of existing CPU hardware. Incidentally, for details of SystemC, please refer to literatures such as "SystemC: From the Ground UP" (David C. Black and Jack Donovan, 2006, Springer Science & Business Media, Inc.).

```
// start of decoder.h
#ifndef ___DECODER_H
#define ___DECODER_H
#include <systemc.h>
SC_MODULE(DECODER)
{
public:
    //port definition
    sc_in<unsigned int> code; //32 bit-code
    sc_out<sc_uint<20>> inst; //instruction
    sc_out<sc_uint<4>> dest; //destination operand
    sc_out<sc_uint<4>> src1; //source operand 1
    sc_out<sc_uint<4>> src2; //source operand 2
    sc_out<sc_uint<4>> mask; //interrupt mask value
    sc_out<sc_uint<4>> int_no; //interrupt number
    sc_out<sc_uint<1>> atomicity; //1 for atomic instruction
    //process declaration
    void decoder(void);
    //constructor
    SC_CTOR(DECODER)
    {
        //process type
        SC_METHOD(decoder);
        //sensitivity list
        sensitive << code;
    }
};
#endif /* ___DECODER_H */
// end of decoder.h
// start of decoder.cpp
#include "decoder.h"
...
void MODULE::decoder(void)
{
    inst = code.range(31, 22); // instruction extraction
    switch(inst)
    {
    ... //operation definition for other instructions
    case CALL:
        src1 = code.range(21, 18);
        mask = atom = dest = src2 = int_no = 0;
    case CALL_CL:
        src1 = code.range(21, 18);
        mask = code.range(17, 14);
        atom = 1;
        dest = src2 = int_no = 0;
        break;
    case INT:
        int_no = code.range(21, 18);
        check_user_vector_range(int_no); //checking of whether it is in user-defined range
        atom = 1;
        dest = src1 = src2 = mask = 0;
        break;
    case INT_CH:
        int_no = code.range(21, 18);
        atom = 1;
        dest = src1 = src2 = mask = 0;
        break;
    ... //operation definition for other instructions
    }
    return;
}
// end of decoder.cpp
// start of executor.h
#ifndef ___EXECUTOR_H
#define ___EXECUTOR_H
#include <systemc.h>
SC_MODULE(DECODER)
{
public:
    //port definition
    sc_in<sc_uint<20>> inst; //instruction
    sc_in<sc_uint<4>> dest; //destination operand
    sc_in<sc_uint<4>> src1; //source operand 1
    sc_in<sc_uint<4>> src2; //source operand 2
    sc_in<sc_uint<4>> mask; //interrupt mask value
    sc_in<sc_uint<4>> int_no; //interrupt number
    sc_in<sc_uint<1>> atomicity; //1 for atomic instruction
    ... //port to memory unit, port to register, etc.
    //process declaration
    void executor(void);
    //constructor
    SC_CTOR(EXECUTOR)
    {
        //process type
        SC_METHOD(executor);
        //sensitivity list
        sensitive << inst;
    }
};
#endif /* ___EXECUTOR_H */
// end of executor.h
// start of executor.cpp
#include "executor.h"
...
void MODULE::executor(void)
{
    if(atomicity == 0){
        process_external_interrupt( ); //checking of existence of any interrupt
    }
```

-continued

```
    switch(inst)
    {
    ... // operation definition for other instructions
    case CALL:
            //program counter update
            PC = read_register(src1);
            break;
    case CALL_CL:
            //storage of system resister into stack
            store_system_registers (*SP, MR, PC);
            SP = SP - 8;
            //interrupt mask update
            MR = mask;
            //program counter update
            PC = read_register(src1);
            break;
    case INT:
    case INT_CH: //same process as is performed with instruction
causing software interrupt
            // storage of system resister into stack
            store_system_registers (*SP, MR, PC);
            SP = SP - 8;
            //interrupt mask register update
            MR = read_intc_ipr(int_no); //interrupt priority order
acquisition from interrupt controller
            //update program counter
            PC = read_int_vec(int_no);   //jump  destination
acquisition from interrupt vector table
            break;
    ... //operation definition for other instructions
    }
    return;
}
// end of executor.cpp
```

Although the present invention has been described above by use of the embodiment, it should be apparent to those skilled in the art that various changes and improvements can be made to the above embodiment, and that embodiments obtained by making such changes and improvements also can be included in the technical scope of the present invention.

For example, in the above embodiment, although CALL and INT instructions are extended according to the present invention, the present invention is also applicable as appropriate to other shifting instructions such as JUMP.

Additionally, application of the present invention is not limited to particular CPU architecture, and the present invention is also applicable to any CPU architecture that includes processes for interrupts to which priority orders are given.

According to the present invention, an instruction having an atomicity, which is achieved by concurrent execution of a call of a process and a value change of an interrupt mask register, is provided to a CPU. This enhances, particularly in an embedded system, security of a process and reliability of a product obtained with the system.

Additionally, by utilizing the extended instructions for processes that conventionally have been programmed with the full utilization of complex programming techniques, a programmer for an embedded system can enhance program efficiency and also can improve code maintainability. Furthermore, the use of the present invention allows hardware to guarantee, both in the program design phase and in the program test phase, that any interrupt is disabled when control is passed from an interrupt process assigned a higher priority level to an interrupt process assigned a lower priority level. Thereby, the designs and tests described above are unnecessary, and therefore, reliability of a program can be enhanced.

Although the preferred embodiment of the present invention has been described in detail, it should be understood that various changes, substitutions and alternations can be made therein without departing from spirit and scope of the inventions as defined by the appended claims.

What is claimed is:

1. A computer system including an interrupt mask register, in which levels are set for respective interrupt processes, the computer system comprising:
    designation means for designating a level to be set in the interrupt mask register and an address of a process to be called;
    execution means for passing control to the address and assigning the interrupt mask register a designated level based on information designated by the designation means, wherein the execution order of the interrupt processes is prioritized based on the process to be called; and
    means for disabling an interrupt as the execution means operates, such that influence from one or more instructions for a call, any other interrupt, and one or more exceptions is prevented while a value of an interrupt is changed so that a content of the interrupt mask register is not altered, wherein the means for disabling the interrupt includes a logic gate.

2. The computer system according to claim 1, wherein the level to be set in the interrupt mask register is set based on an operand following a predetermined instruction.

3. A computer system comprising:
    an interrupt mask register;
    level storage means storing a level for each individual interrupt;
    execution means for shifting execution processes to the interrupt when acquiring a level for the interrupt, to which the execution process is shifted, from the level storage means, and for setting the acquired level in the interrupt mask register; and
    means for disabling an interrupt as the execution means operates, such that influence from one or more instructions for a call, any other interrupt, and one or more exceptions is prevented while a value of an interrupt is changed so that a content of the interrupt mask register is not altered, wherein the means for disabling or overriding the interrupt includes a logic gate.

4. The computer system according to claim 3, wherein the execution means responds to occurrence of an interrupt.

5. A method of controlling a computer system, the computer system including an interrupt mask register in which levels are set for respective interrupt processes, the method comprising the steps of:
    designating a level to be set in the interrupt mask register and an address of a process to be called, wherein the execution order of the interrupt processes is prioritized based on the process to be called;
    passing control to the address;
    assigning the interrupt mask register the designated level on the basis of information designated in the designation step; and
    disabling an interrupt during an execution step, such that influence from one or more instructions for a call, any other interrupt, and one or more exceptions is prevented while a value of an interrupt is changed so that a content of the interrupt mask register is not altered, wherein a means for disabling the interrupt includes employing a logic gate.

6. The method of controlling a computer system according to claim 5, wherein the level to be set in the interrupt mask register is set based on an operand following a predetermined instruction.

7. A method of controlling a computer system, the computer system including an interrupt mask register and in which levels are set for respective interrupt processes, the method comprising the steps of:
  shifting execution processes to an interrupt;
  acquiring a level for the interrupt, to which the execution process is shifted, from a level storage means;
  setting an acquired level in the interrupt mask register; and
  disabling another interrupt during an execution step, such that influence from one or more instructions for a call, any other interrupt, and one or more exceptions is prevented while a value of an interrupt is changed so that a content of the interrupt mask register is not altered, wherein a means for disabling the another interrupt during the execution step includes employing a logic gate.

8. The method according to claim 7, wherein the steps of shifting execution processes, acquiring a level for the interrupt, and setting an acquired level in the interrupt mask register occur in response to an occurrence of an interrupt.

9. The system according to claim 1, wherein the logic gate includes an AND gate.

10. The system according to claim 1, further comprising a central processing unit (CPU) architecture that is modified so that a content of the interrupt mask register is directly changed based on a decoding result of one or more instruction decoders within the CPU.

11. The system according to claim 10, wherein the CPU architecture is configured to execute an instruction which concurrently executes a call of a process and a value change of the interrupt mask register, and to disable other interrupts during execution of the instruction to achieve atomicity.

12. The method according to claim 7, wherein the value of the interrupt mask register is changed by employing at least one of one or more extended CALL instructions and one or more extended software interrupt instructions.

13. The method according to claim 7, wherein a content of the interrupt mask register is directly changed based on a decoding result of one or more instruction decoders within the CPU.

14. The method according to claim 7, wherein atomicity is achieved by executing an instruction which concurrently executes a call of a process and a value change of the interrupt mask register, and by disabling other interrupts during execution of the instruction.

* * * * *